(12) United States Patent
Davidson

(10) Patent No.: US 7,092,644 B2
(45) Date of Patent: Aug. 15, 2006

(54) OPTICAL RECEIVER INCLUDING A DUAL GAIN PATH AMPLIFIER SYSTEM

(75) Inventor: Andrew Davidson, Mountain View, CA (US)

(73) Assignee: New Focus, Inc., San Jose, CA (US)

( * ) Notice: Subject to any disclaimer, the term of this patent is extended or adjusted under 35 U.S.C. 154(b) by 718 days.

(21) Appl. No.: 09/967,415

(22) Filed: Sep. 28, 2001

(65) Prior Publication Data
US 2003/0063354 A1 Apr. 3, 2003

(51) Int. Cl.
H04B 10/06 (2006.01)
(52) U.S. Cl. .................. 398/202; 398/210; 398/213
(58) Field of Classification Search ........... 398/202, 398/210, 213; 359/333; 330/304, 308, 85, 330/282, 256, 310; 250/227, 214, 214 A, 250/227.14–19; 324/115, 123, 132
See application file for complete search history.

(56) References Cited

U.S. PATENT DOCUMENTS

| | | | | |
|---|---|---|---|---|
| 3,652,934 A * | 3/1972 | Paljug et al. | ............... | 324/115 |
| 4,760,647 A * | 8/1988 | Gillis | ........................ | 33/780 |
| 5,311,353 A * | 5/1994 | Crawford | ................... | 359/333 |
| 6,323,734 B1 * | 11/2001 | Henrion et al. | ............ | 330/308 |
| 6,376,830 B1 * | 4/2002 | Froggatt et al. | ...... | 250/227.14 |
| 6,404,281 B1 * | 6/2002 | Kobayashi | ................... | 330/85 |
| 6,583,909 B1 | 6/2003 | Wada | | |
| 6,583,910 B1 | 6/2003 | Satoh | | |
| 6,603,587 B1 | 8/2003 | Yokoyama et al. | | |
| 6,606,171 B1 * | 8/2003 | Renk et al. | ................ | 358/475 |

OTHER PUBLICATIONS

"Swept Wavelength Testing: Insights Into Swept-Wavelength Characterization of Passive Fiber-Optic Components", Application Note 11, Rev B, New Focus, Inc., San Jose, CA, 2001.

* cited by examiner

Primary Examiner—Jason Chan
Assistant Examiner—Quan-Zhen Wang
(74) Attorney, Agent, or Firm—Meyertons Hood Kivlin Kowert & Goetzel, P.C.; B. Noël Kivlin

(57) ABSTRACT

An optical receiver may include a photodetector that is configured to generate an electrical signal in response to detecting an optical signal, a first gain path coupled to receive and amplify the electrical signal generated by the photodetector, and a second gain path coupled to receive and amplify the electrical signal generated by the photodetector. The second gain path may have a higher gain than the first gain path. The two gain paths may be configured to amplify the electrical signal independently of each other. The optical receiver may also include a switch that selectably outputs an amplified electrical signal from one of the gain paths based on a magnitude of a signal corresponding to the optical signal.

36 Claims, 7 Drawing Sheets

OPTICAL RECEIVER INCLUDING A DUAL GAIN PATH AMPLIFIER SYSTEM

BACKGROUND OF THE INVENTION

1. Field of the Invention

This invention relates to optical systems and, more particularly, to amplifier systems for use in optical receivers.

2. Description of the Related Art

Fiber optic WDM (Wavelength Division Multiplexing) and DWDM (Dense WDM) systems are increasingly using more channels, narrower channel spacing, and wider wavelength ranges. As fiber optic systems such as these become more complex, it becomes increasingly important to characterize the wavelength-dependent optical properties of both broadband network components (e.g., couplers, combiners, splitters, attenuators, isolators, circulators, etc.) and narrowband network components (e.g., multiplexers, demultiplexers, interleaves, wavelength filters, etc.). By characterizing the optical properties of components, properties such as wavelength flatness and polarization-dependent loss that may adversely affect network system performance may be identified. In narrowband devices, it may be particularly useful to measure the center wavelength, crosstalk, and/or channel spacing in order to improve system performance. Since narrowband and broadband devices may be used over the entire wavelength band of a WDM or DWDM system, it may also be useful to test each device over the entire wavelength band (as opposed to just testing over the channel of intended operation for each particular device). Characterization systems may also be used to provide real-time feedback while adjusting the placement and/or orientation an optical component in a system.

One way in which optical components may be characterized is by measuring the throughput power as a function of wavelength. This may provide information about a component's center wavelength, channel spacing, wavelength flatness, filter transfer function, and/or crosstalk. A common type of measurement system is a step-and-measure system. In a step-and-measure system, an operator tunes a tunable laser source to each wavelength used to characterize the component under test and then detects and measures the component's output at that wavelength. One consequence of the increasing wavelength range of optical systems is that optical components need to be tested over these larger wavelength bands. Additionally, the narrower channel spacing may make higher resolution in the measurements desirable. Since more data points may be measured in systems that have larger wavelength ranges and/or higher resolution, testing using a step-and-measure system may take a undesirable amount of time. For example, in a 50-GHz DWDM system with 80 channels and channel spacing of 0.4 nm, component performance may need to be characterized over a wavelength span of greater than 35 nm. Properly characterizing the component may also require a resolution of 0.01 nm. Consequentially, a measurement for the device may involve at least 3,500 data points. In a step-and-measure system, this measurement may take hours to complete.

In order to improve measurement times, swept-wavelength systems have been developed in which the wavelength of the tunable laser source is automatically swept across a range of wavelengths while the output from the component under test is recorded. The wavelength sweep may occur very quickly, allowing a component to be characterized in significantly less time than it could in a step-and-measure system. However, because of the increased speed at which swept-wavelength systems operate, receivers used in such systems need to have enough dynamic range to capture the optical component's output over the sweep of the laser while still operating quickly enough to provide the desired resolution.

Optical receivers used with swept-wavelength systems may need to handle a large dynamic range relatively quickly. However, in some receiver components (e.g., analog logarithmic amplifiers), there may be a tradeoff between speed and dynamic range. For example, amplifiers designed to operate at speeds commensurate with those used in swept-wavelength systems may not provide the dynamic range needed to capture an optical component's output over the entire sweep of the laser. Conversely, logarithmic amplifiers designed to have the needed dynamic range may not operate quickly enough to provide the desired measurement resolution.

SUMMARY

Various embodiments of methods and systems for amplifying an electrical signal that corresponds to an optical signal are disclosed. In some embodiments, an optical receiver may include a photodetector that is configured to generate an electrical signal in response to detecting an optical signal, a first gain path coupled to receive and amplify the electrical signal generated by the photodetector, and a second gain path coupled to receive and amplify the electrical signal generated by the photodetector. The second gain path may have a higher gain than the first gain path. The two gain paths may be configured to amplify the electrical signal independently of each other. The optical receiver may also include a switch that selectably outputs an amplified electrical signal from one of the gain paths based on a magnitude of a signal corresponding to the optical signal. In some embodiments, the two gain paths may provide more dynamic range than a single gain path.

In another embodiment, a system may include a tunable laser configured to provide optical stimuli to an optical device, an optical receiver, and an analog-to-digital converter. The optical receiver may include a photodetector configured to detect an optical signal output from the optical device in response to the optical stimuli and to generate an electrical signal corresponding to the optical signal. The optical receiver may also include an amplifier system coupled to the photodetector and configured to amplify the electrical signal generated by the photodetector. The amplifier system includes a first gain path and a second gain path, which are each configured to independently amplify the electrical signal. The first gain path may provide a higher gain than the second gain path, and the amplifier system may selectably output an amplified electrical signal from one of the gain paths dependent on a magnitude of a signal corresponding to a power of the optical signal. The analog-to-digital converter may convert the amplified electrical signal output from the amplifier system to a digital signal.

One embodiment of a method of amplifying an electrical signal corresponding to an optical signal output by an optical component involves detecting the optical signal output by the optical component and responsively generating an electrical signal corresponding to the optical signal, providing the electrical signal to a first amplifier path, providing the electrical signal to a second amplifier path, and selecting an amplified signal from one of the first amplifier path and the second amplifier path based on a magnitude of a signal corresponding to the optical signal. The first amplifier path may have a higher gain than the second amplifier path, and the first and second amplifier paths are each configured to amplify the electrical signal independently of each other.

Figure 1A:
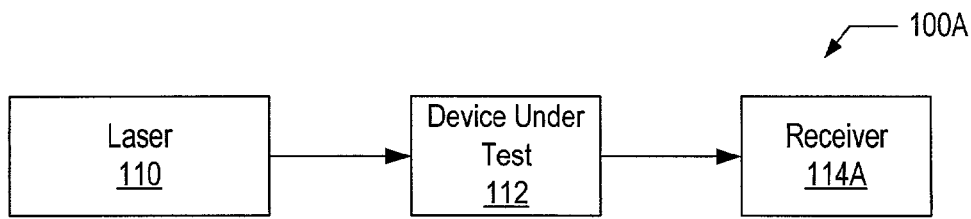
FIGS. 1A–1C shows various embodiments of characterization systems that may be used to characterize various properties of optical components.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly connected."

DETAILED DESCRIPTION OF EMBODIMENTS

Figure 1B:
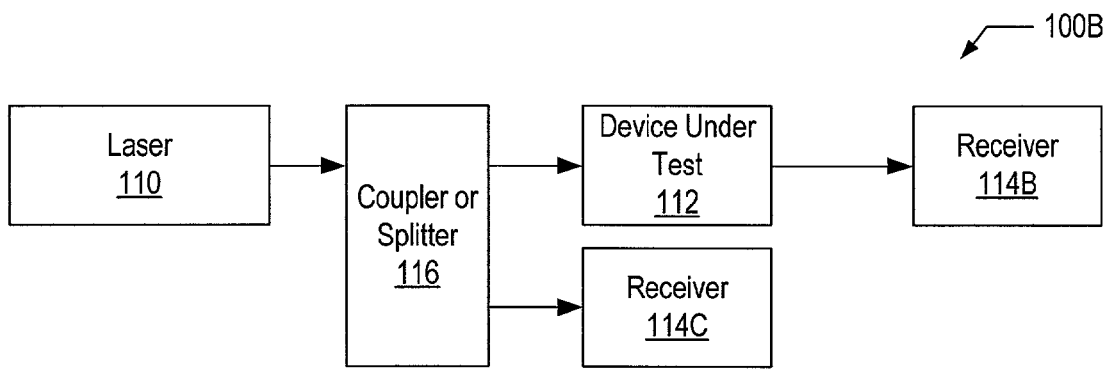
Figure 1C:
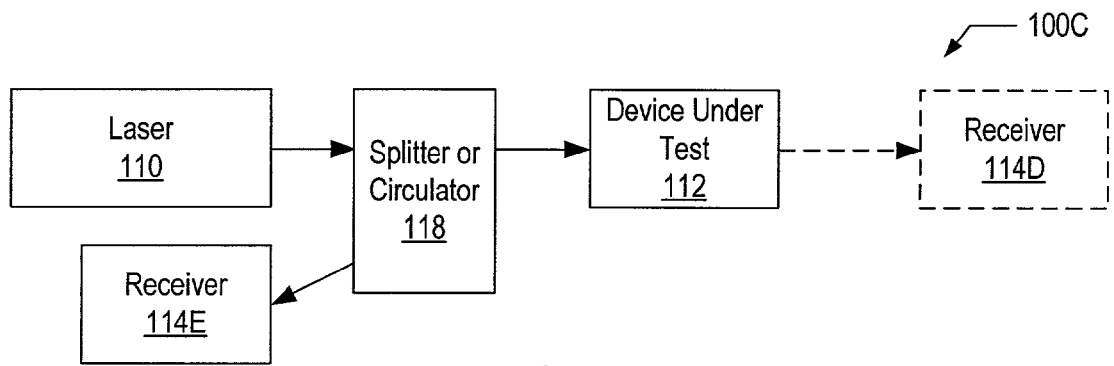

Before describing various embodiments of an optical receiver that includes a dual gain path amplifier, several systems that may include such an optical receiver will be discussed. FIGS. 1A–1C show typical measurement systems that may be used to characterize an optical component. In some embodiments of the systems shown in FIGS. 1A–1C, the optical component or device under test (DUT) 112 may include a coupler, combiner, splitter, attenuator, isolator, circulator, multiplexer, demultiplexer, interleaver, or wavelength filter.

FIG. 1A shows a system that may be used to measure the transmission characteristics of an optical component 112. In FIG. 1A, a laser 110 provides an input to DUT 112 and the output from that device is received by receiver 114A. The optical stimuli provided by laser 110 may sweep across a range of wavelengths, allowing the transmission of the component 112 to be characterized as a function of wavelength.

In FIG. 1B, a system that may be used to measure insertion loss or filter rejection is illustrated. A laser 110 provides optical stimuli to an optical component 112. The output of the optical component 112 is received by receiver 114B. Before being provided to the optical component 112, the optical stimuli may be passed through an optical splitter or coupler 116, allowing a reference receiver 114C to characterize the optical stimuli. The output of the reference receiver 114C may be used to normalize the output of receiver 114B for any intensity fluctuation in the optical stimuli and/or any wavelength-dependent sensitivity variations in receiver 114B. As in FIG. 1A, the optical stimuli provided by laser 110 may sweep across a wavelength band.

FIG. 1C shows a system that may be used to measure a reflected or an incident optical signal from an optical component 112. A laser 110 provides optical stimuli to an optical component 112. The optical signal reflected by optical component 112 may be received by receiver 114E. Alternatively, the optical signal transmitted by optical component 112 may be measured using receiver 114D. As in the above figures, laser 110's output may sweep across a wavelength band in order to characterize the component as a function of wavelength.

In some embodiments, a characterization system may characterize several optical components or, alternatively, several different channels output by an optical component at the same time. In such an embodiment, multiple detectors and receivers may be used to detect the output from each component and/or channel.

The systems shown in FIGS. 1A–b 1C may use a swept-wavelength laser to provide an optical signal to the optical component under test. For example, a swept-wavelength laser may be configured to sweep from 1520 nm to 1570 nm at 100 nm/sec. The optical component being tested may be a passive component such as an optical filter designed to provide 60 to 70 dB of attenuation in the stop band. Thus, the receiver 114 may be configured to operate over a fairly wide dynamic range (e.g., 60–70 dB optical power) relatively quickly (e.g., during a 10 µs time period). Furthermore, since the electrical signal (e.g., a voltage or a current) corresponding to the optical power may have a 120 to 140 dB range, logarithmic amplification may be used to compress the range of the corresponding electrical signal.

Figure 1D:
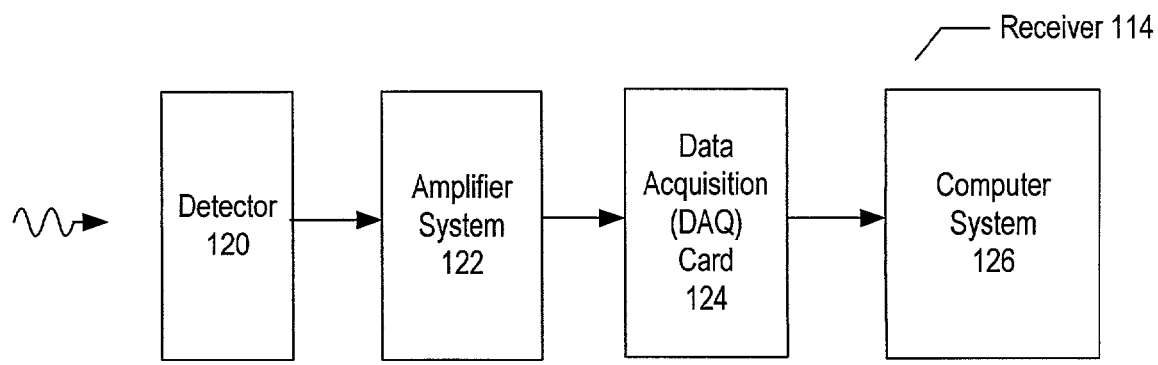
FIGS. 1D–1E show embodiments of receivers that may be used in systems like those shown in FIGS. 1A–1C.
Figure 1E:
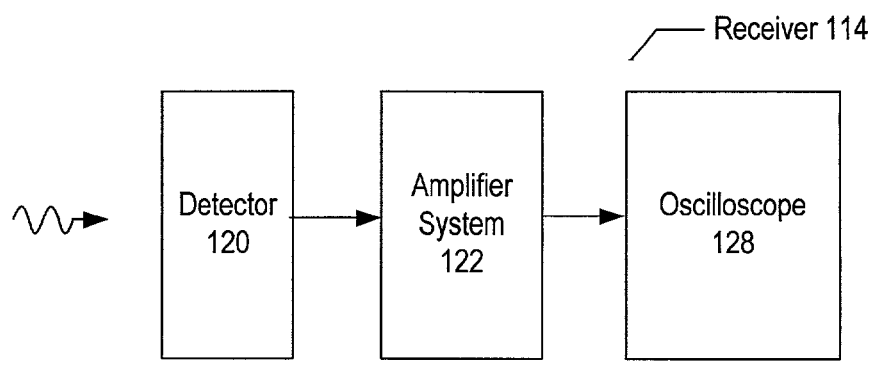

FIG. 1D and 1E show embodiments of receiver 114 that may be used as any of the receivers 114A–114E in the systems shown in FIGS. 1A–1C. As illustrated in FIG. 1D, receiver 114 may include detector 120, amplifier system 122, data acquisition card 124, and computer system 126. Detector 120 may include one or more photodetectors such as photodiodes, photomultipliers, phototransistors, etc. that are configured to detect an optical signal output by the optical component 112 (and/or laser 110) and to convert the detected optical signal to an electrical signal. Amplifier system 122 may amplify the electrical signal. Additionally, amplifier system 122 may compress the electrical signal (e.g., using one or more logarithmic amplifiers) so that the output electrical signal is proportional to the logarithm of the optical power of the optical signal. Data acquisition card 124 may receive the analog signal from amplifier system 122 and convert the analog signal to a digital signal. Data acquisition card 124 may additionally process the analog or digital signal before providing the digital signal to computer system 126. Computer system 126 may record and store the digital signal provided by data acquisition card 124. Computer system 126 may also provide visual output corresponding to the digital signal on a display. For example, computer system 126 may provide an oscilloscope-type display corresponding to the optical signal output by optical component 112 versus wavelength.

FIG. 1E shows another embodiment of receiver 114. In this embodiment, receiver 114 includes detector 120, amplifier system 122, and oscilloscope 128. In this embodiment, instead of providing the output of amplifier system 122 to a data acquisition card 124 and computer system 126, the output may be provided to an oscilloscope 128 for display as a function of wavelength. If the laser providing the stimuli to the optical component under test is a swept-wavelength laser, the laser may provide a trigger signal to oscilloscope 128.

Figure 2:
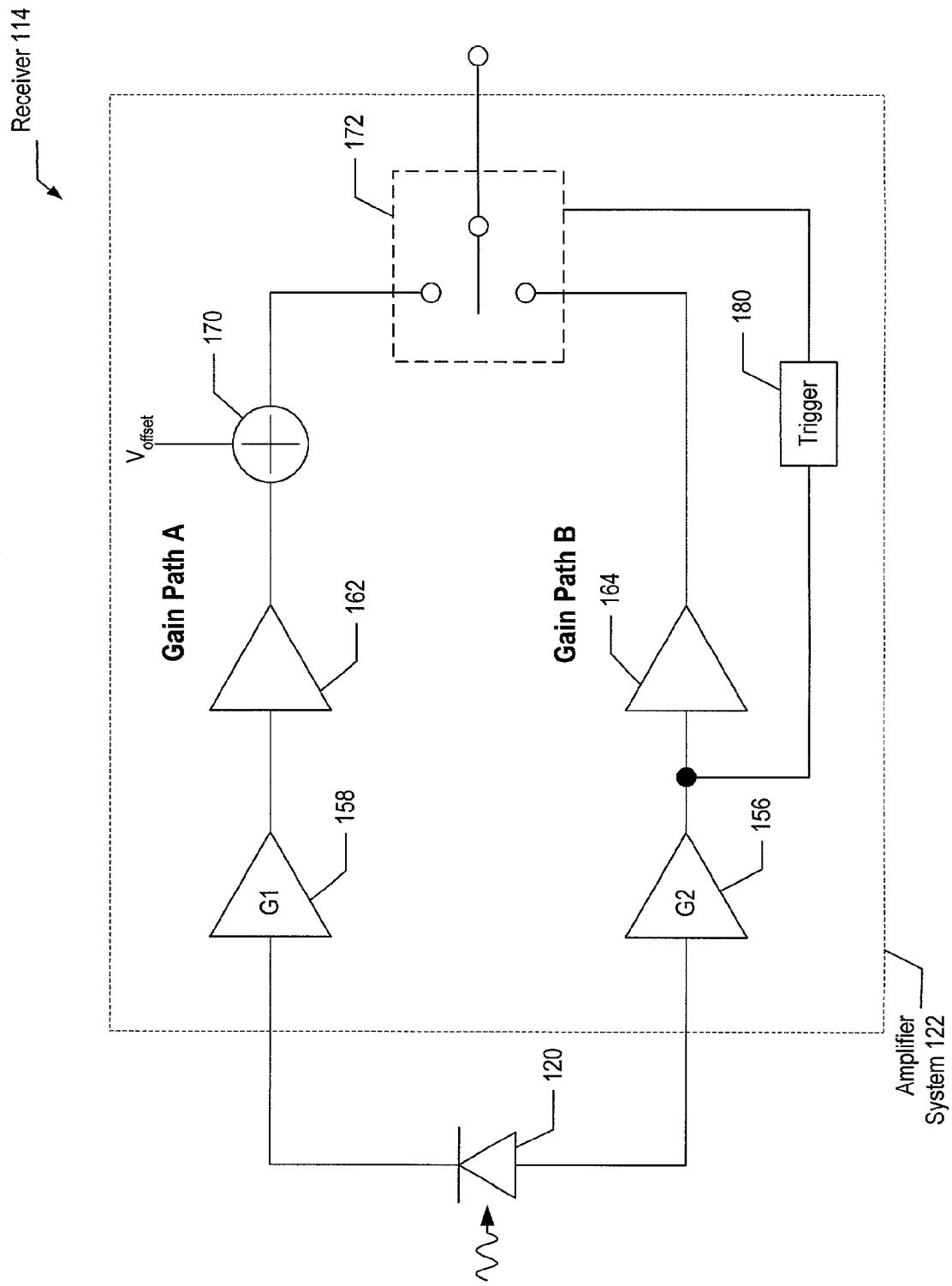
FIG. 2 shows one embodiment of a dual gain path amplifier system that may be included in an optical receiver.
Figure 3:
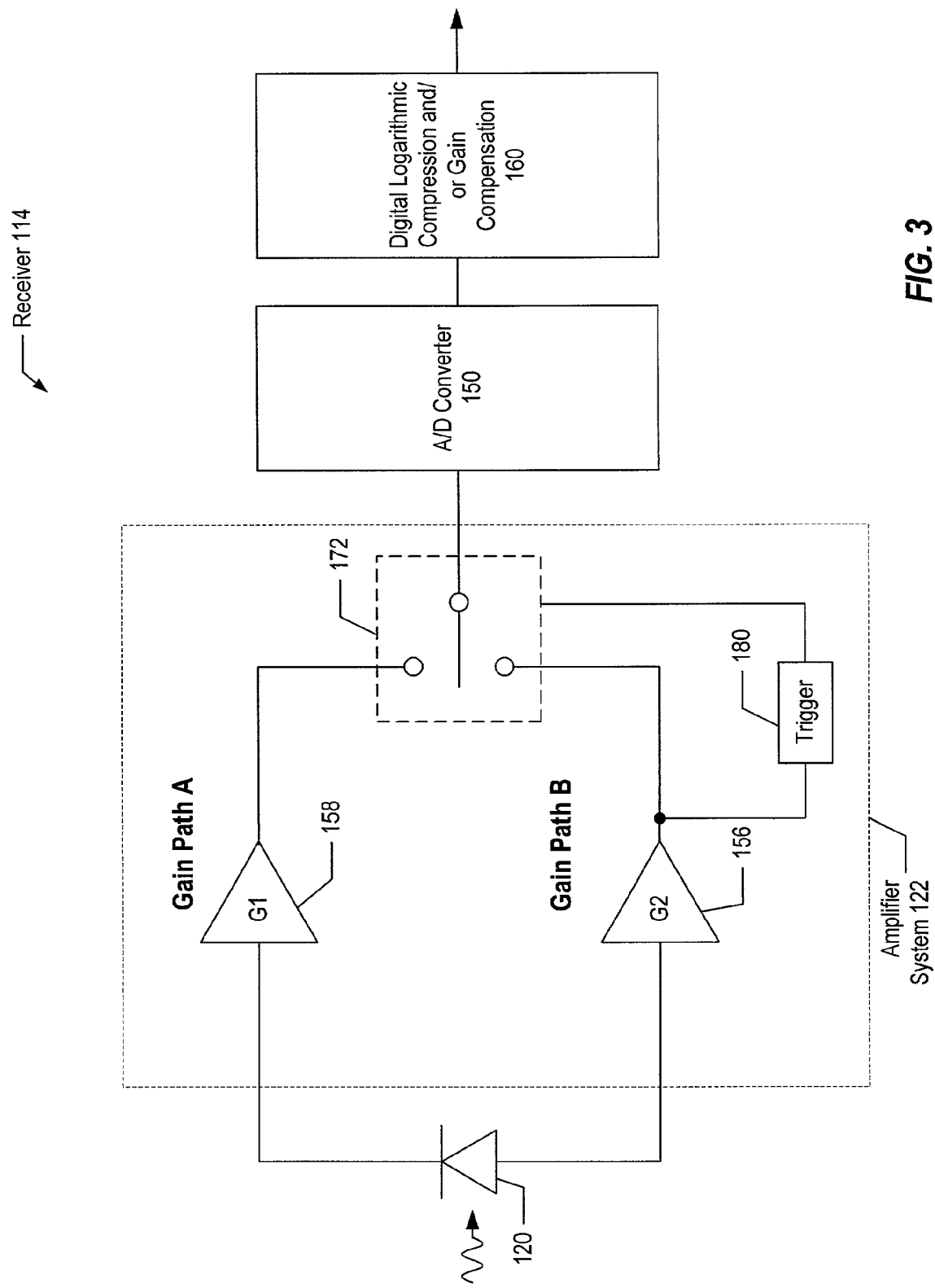
FIG. 3 shows an embodiment of a dual gain path amplifier system that includes an analog-to-digital (A/D) converter and digital components for performing logarithmic amplification.
Figure 4:
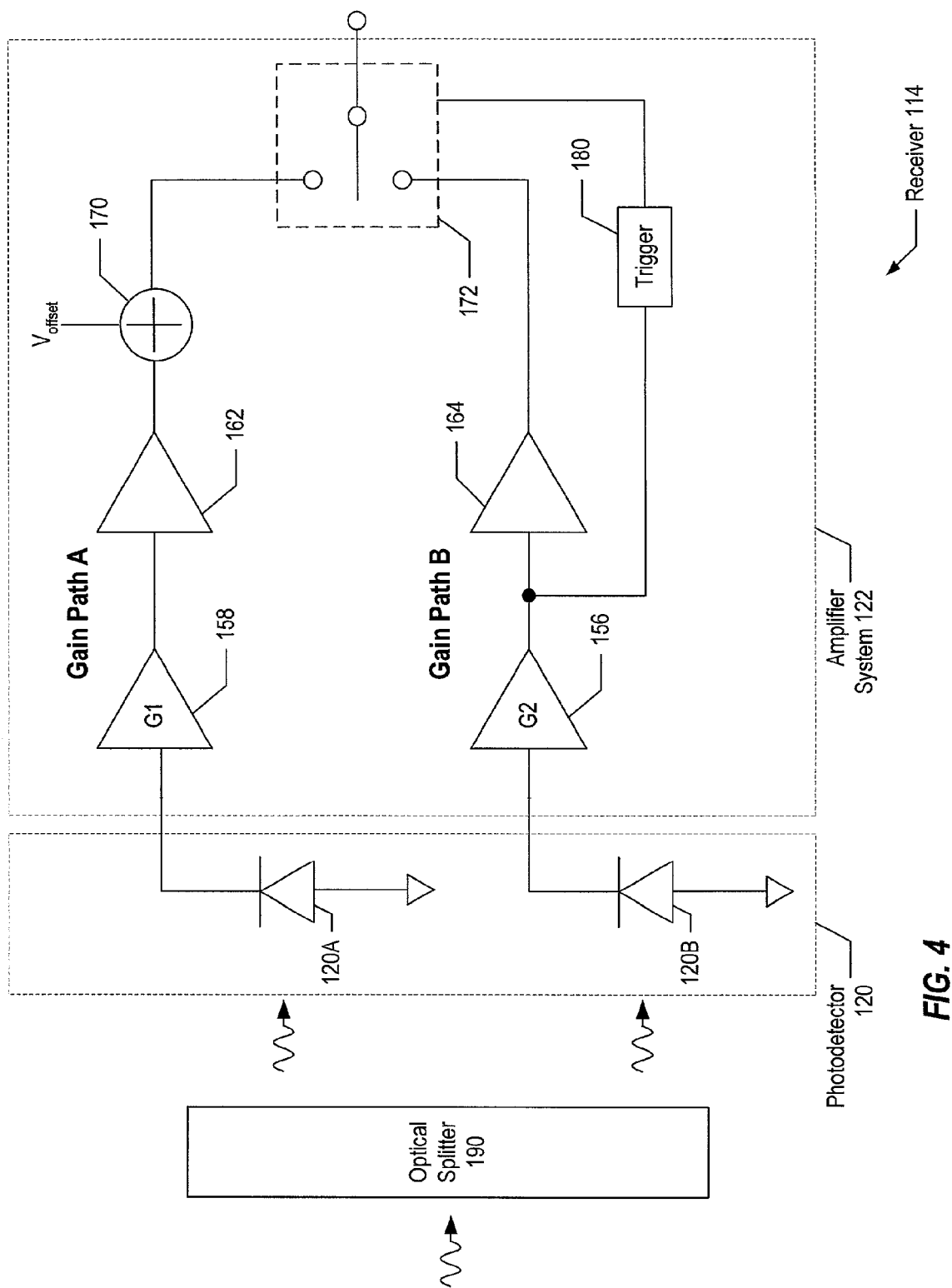
FIG. 4 shows an embodiment of a dual gain path amplifier system in which each gain path is coupled to an independent photodetector.

Various embodiments of detector 120 and amplifier system 122 are shown in FIGS. 2–4. In the illustrated embodiments, an amplifier system 122 may produce an electrical signal whose magnitude is proportional to the logarithm of the optical power of the optical signal detected by detector 120. The output of any of the amplifier systems shown in FIGS. 2–4 may be provided to an oscilloscope, data acquisition card, etc. (e.g., as shown in FIGS. 1D–1E).

As shown in FIG. 2, receiver 114 may include detector 120 (which is a photodiode in this embodiment) that is configured to detect an optical signal output by an optical component and to responsively generate an electrical signal (typically a current). The electrical signal generated by detector 120 may be amplified in two independent gain paths. Gain Path A may include linear amplifier 158 and logarithmic amplifier 162. Gain Path B may include linear amplifier 156 and logarithmic amplifier 164. The two independent gain paths may have different gains. For example, linear amplifier 158 may have a gain G1 that is less than the gain G2 of linear amplifier 156. Gain Path A may be used to handle larger signals and Gain Path B may be used to handle smaller signals.

An offset voltage may be added into one of the gain paths to compensate for differences in the gains of the linear amplifiers 156 and 158. Here, the offset voltage is added at summation junction 170. Since the offset voltage is added after the logarithmic amplifier 162, the offset voltage may be proportional to log (G2/G1). In the illustrated embodiment, the offset voltage is added to Gain Path A, although in other embodiments, the offset voltage may instead be added to Gain Path B. In such an embodiment, the offset voltage may be proportional to log (G1/G2).

Switch 172 may select the output from one of the gain paths based on the amplitude of the output signal. Switch 172 may be configured to switch between the two paths when the output signal (e.g., the output signal of the currently selected gain path) that corresponds to the input optical signal crosses a threshold level. When the output voltage is below the threshold, the switch may select the output from Gain Path B, which is the gain path that has the higher gain. Similarly, when the output voltage is above the threshold, switch 172 may select the output from Gain Path A. The switch may be placed further upstream in some embodiments. However, if switch 172 is placed upstream from the summation junction 170, transients that arise during switching may increase. In turn, the transients may cause ringing in any amplifiers downstream from the switch. Thus, by placing switch 172 downstream from the summation junction, problems that arise due to transients in the switch's output and subsequent circuitry may be reduced in some embodiments. Additionally, if the switch is placed before the summation junction, the offset voltage may also need to be switched in and out dependent on which gain path is currently selected.

In the some embodiments, the threshold level that triggers switch 172 may be selected so that the signals from each gain path are nearly identical around the threshold point. In some embodiments, switch 172 may be a FET-based (Field Effect Transistor) switch that provides a relatively uninterrupted signal as it switches between the first and second gain paths. In embodiments where switch 172 is not fast enough to provide a relatively uninterrupted signal, switch 172 may be configured to provide a weighted average of the two gain paths' outputs during the time in which it is switching between the paths. For example, during the switching period taking place while switching from Gain Path A to Gain path B, the output of switch 172 may depend on the outputs of both gain paths. During the early portion of the switching period, the output of switch 172 may more heavily depend on Gain Path A, and during the later portion of the switching time period, the output of switch 172 may more heavily depend on Gain Path B. Once switching is complete, the output of switch 172 may depend solely on the output of Gain Path B.

A trigger mechanism 180 may be added into at least one of the gain paths. Trigger 180 may provide hysteresis, reducing the number of times switch 172 switches between the two gain paths when the signal level is near the threshold level.

Using two independent gain paths to amplify the electrical signal generated by a photodetector as shown in FIG. 2 may increase the dynamic range of an amplifier system. For example, with a single gain path, there may be a tradeoff between speed and dynamic range. By providing two gains paths with different gains, however, this tradeoff may be avoided, providing greater dynamic range than would be possible with a single gain path of equal response speed. Similarly, while an amplifier may be likely to saturate when the input level increases past a certain level, having two gain paths allows one gain path to be designed to handle input levels that cause the other gain path to saturate. Additionally, embodiments using analog components in both gain paths may provide a less expensive solution than those using digital components would.

Figure 2A:
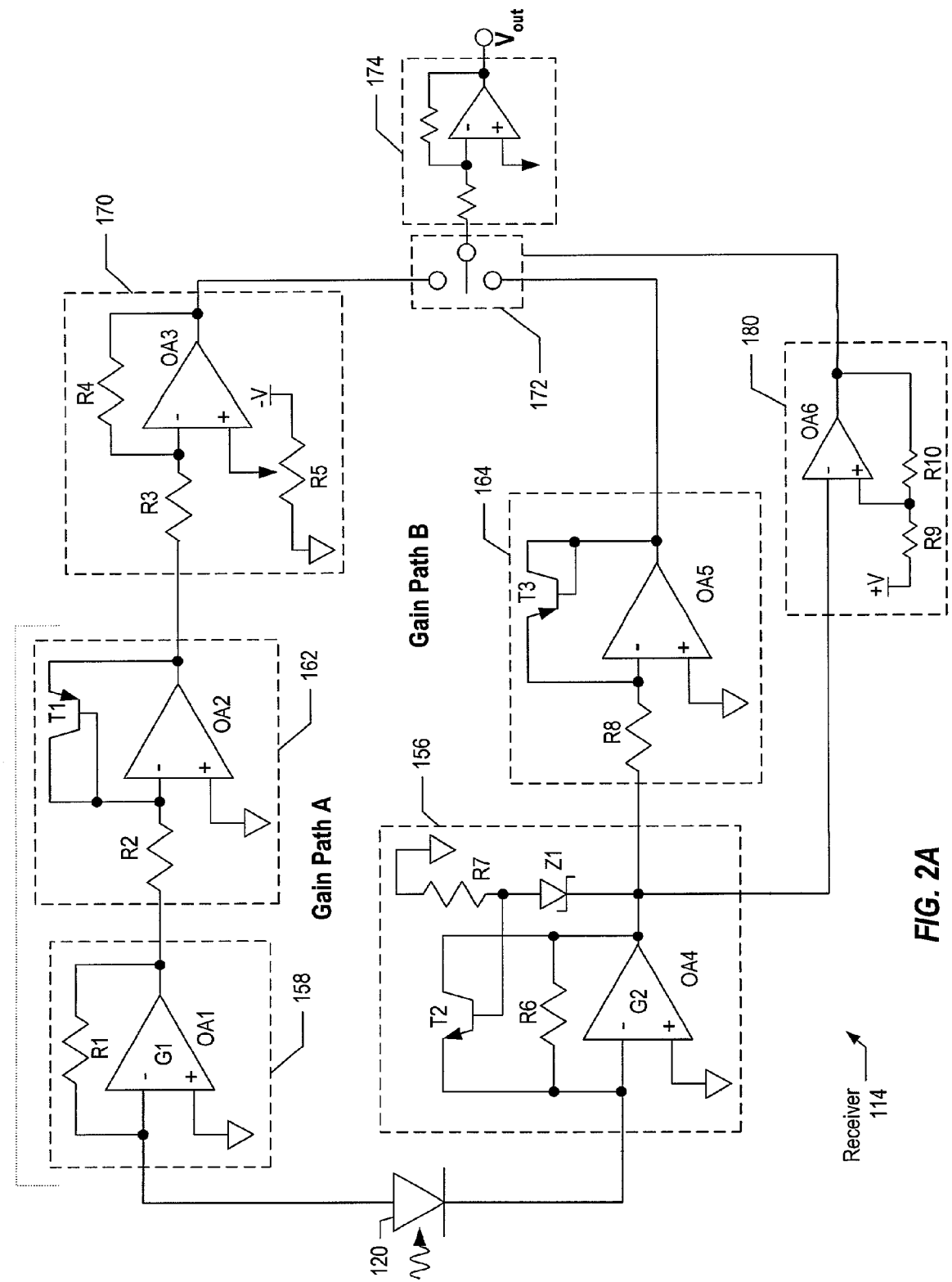
FIG. 2A shows another embodiment of an amplifier system that may be included in an optical receiver.

FIG. 2A shows a more detailed embodiment of a photodetector and amplifier system that may be used in an optical receiver 114. Detector 120 may be configured to generate a current whose magnitude corresponds to the optical power of the input signal. In one embodiment, detector 120 may include a photodiode selected to have an output range from 10 mA to 1 nA (seven decades). Such a photodiode may be configured to output approximately one Amp of current per Watt of input.

In the illustrated embodiment, Gain Path A includes linear transimpedance amplifier 158, logarithmic amplifier 162, and summation junction 170. Gain Path B includes linear transimpedance amplifier 156, logarithmic amplifier 164, and trigger 180. The gain G1 of linear transimipedance amplifier 158 may be lower than the gain G2 of linear transimpedance amplifier 156. Switch 172 may be configured to select the output of Gain Path A for higher signal levels and the output of Gain Path B for lower signal levels and to provide the output from one of the gain paths to additional components in optical receiver 114. Switch 172 may switch between the gain paths when the output level crosses a threshold level.

Generally, transimpedance amplifiers 158 and 156 produce an output voltage level based on an input current. The ratio of the output voltage to the input current reflects the gain (measured in ohms) of each transimpedance amplifier. In the illustrated embodiment, linear transimpedance amplifier 158 includes operation amplifier (op-amp) OA1 and resistor R1. The gain G1 of linear transimpedance amplifier 118 may be relatively low (e.g., 500 Ω) compared the gain G2 (e.g., 1.5 M Ω) of linear transimpedance amplifier 156.

Linear transimpedance amplifier 156 includes op-amp OA4 and feedback resistor R6. Linear transimpedance amplifier 156 may have a significantly higher gain G2 than that of linear transimpedance amplifier 158. Because amplifier 156 has a relatively high gain, amplifier 156 may saturate when certain input signals are received (e.g., in one embodiment, amplifier 156 may saturate when the input current is greater than 3 μA). If amplifier 156 saturates, it may present a high impedance to photodiode 116, which may create inaccuracies in optical receiver 114. In order to keep amplifier 156 from saturating, a non-linear element or switch may be included in the feedback path of amplifier 156. In the embodiment illustrated in FIG. 2A, the switch includes a transistor T2, resistor R7, and zener diode D1. Transistor T2 is configured to turn on at a certain input level, effectively shorting the feedback resistor R6 and reducing the gain of amplifier 156. The input level at which transistor T2 is configured to turn on may be selected between an input level that would cause amplifier 156 to saturate and an input level which causes switch 172 to switch from selecting Gain Path B to selecting Gain Path A (so that the output of the amplifier system is not affected when gain G2 is reduced by the switch).

Each gain path may also include a logarithmic amplifier 162 or 164. In order to provide satisfactory logarithmic behavior over the input range, the transistors (T1 and T3) in each logarithmic amplifier may be temperature stabilized in some embodiments. Providing temperature stabilization may involve coupling a heating element (not shown) to each transistor. The heating element may decrease the amount of heat provided to a transistor as that transistor's operating temperature increases so that it is kept at a relatively constant temperature. In other embodiments, each transistor may be temperature stabilized by providing a cooling element (e.g., a Peltier cooler) that is configured to provide increased cooling as that transistor generates more heat.

A trigger with hysteresis 180 may be provided to reduce the frequency at which switch 172 switches between the gain paths. In the illustrated embodiment, trigger 180 is a Schmitt trigger. The Schmitt trigger 180 may use positive feedback to provide hysteresis, causing the threshold level at which switch 172 switches from Gain Path A to Gain Path B to differ slightly from the threshold level at which switch 172 switches from Gain Path B to Gain Path A.

An additional amplifier 174 may be coupled to the output of switch 172. Amplifier 174 may provide additional amplification in order to set the output voltage at a desired level. For example, $V_{out}$ may be set to 1V per decade of the optical power of the input signal. Additional receiver components (e.g., an oscilloscope or a data acquisition card) may be coupled to receive $V_{out}$.

FIG. 3 shows another embodiment of photodetector 120 and dual gain path amplifier system 122. In some embodiments, components included in FIG. 3 may be configured similarly to components shown in FIG. 2A that have the same reference number.

In this embodiment, two independent gain paths, Gain Path A and Gain Path B, each include a linear amplifier (158 and 156 respectively). Linear amplifier 158 may have a relatively high gain G2 while linear amplifier 156 may have a relatively low gain G1. Gain Path A may be used to handle lower signal levels and Gain Path B may be used to handle higher signal levels. Switch 172 may select the output of one of the gain paths based on whether the magnitude of a signal corresponding to the optical signal is above or below a threshold. As in the embodiments shown in FIGS. 2 and 2A, a trigger 180 that reduces back and forth switching when the magnitude of the signal is near the threshold level may be included.

The output of the gain path selected by switch 172 may be converted from an analog signal to a digital signal by analog-to-digital converter 150. Logarithmic compression and/or gain compensation (to compensate for differences in the gains G1 and G2 of the linear amplifiers) may be performed by digital components 160 (e.g., these components may be included on a data acquisition card).

In FIG. 4, yet another embodiment of detector 120 and dual gain path amplifier system 122 is shown. In this embodiment, detector 120 includes two photodiodes 120A and 120B. The optical signal output by the device under test may be passed through an optical splitter or coupler 190 in order to provide the optical signal to both photodiodes. In some embodiments (e.g., where a passive optical splitter or coupler is used), the optical signals provided to each of the photodiodes may have significantly less power than the optical signal output from the device under test. For example, if a 10%/90% coupler is used to split the optical signal, the optical signal output from the coupler to Gain Path B may have approximately $\frac{1}{10}^{th}$ the power of the signal output by the optical component. Additionally, some optical couplers or splitters may introduce polarization dependencies. The amplifier system may include components designed to compensate for the effects of the optical coupler or splitter 190.

Each photodiode may be coupled to provide an input to an independent gain path. Gain Path A may provide a lower gain than Gain Path B. Similarly to the embodiments illustrated in FIGS. 2–3, the illustrated embodiment may provide gain compensation (e.g., by adding an offset voltage at summation junction 170), a switch 172 to select between gain paths based on whether the magnitude of a signal corresponding to the optical signal (e.g., the currently selected output signal) is above or below a threshold level, and a trigger with hysteresis 180 to reduce the back and forth switching of switch 172 when the magnitude of the signal is near the threshold level.

In some embodiments, components included in FIG. 4 may be configured similarly to components shown in FIG. 2A that have the same reference number.

While FIGS. 2–4 show one or more unbiased photodiodes being used as detector 120, other embodiments may use different components. For example, biased photodiodes may be used in some embodiments. Biasing a photodiode may provide improved linearity throughout the optical power range over which an optical component is being characterized. Biasing may also reduce junction capacitance and increase shunt resistance. However, biasing a photodiode may also create a leakage current. Thus, an additional compensation element may be added to the amplifier system 122 in order to compensate for the leakage current in the photodiode in such an embodiment. Other embodiments may use components other than photodiodes (e.g., phototransistors, photomultipliers, etc.) as detector 120.

Different embodiments of an optical receiver may incorporate all or some of the features of the exemplary embodiments shown in FIGS. 2–4. Additionally, while the various embodiments of a dual gain path amplifier system have been described in the context of a characterization system, such a dual gain path system may also be used in other systems. For example, an optical receiver used in a spectroscopic system or an optical spectrum analyzer may include a dual gain path amplifier like those shown in FIGS. 2–4.

Figure 5:
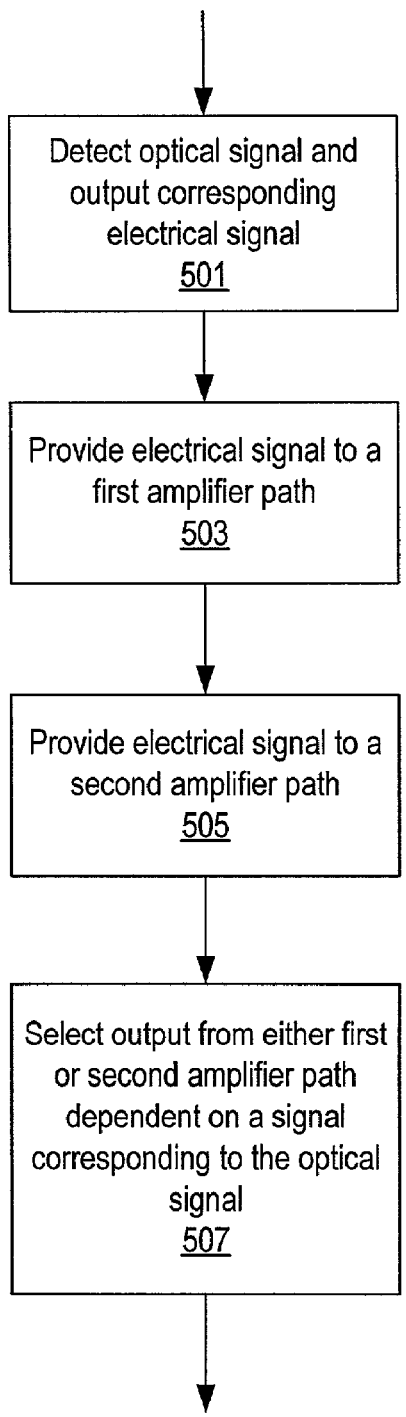
FIG. 5 is a flowchart illustrating one embodiment of a method of amplifying an electrical signal corresponding to an optical signal.

FIG. 5 is a flowchart illustrating one embodiment of a method of amplifying an electrical signal corresponding to an optical signal. At 501, the optical signal is detected and a corresponding electrical signal is generated. Performing block 501 may involve providing the optical signal to one or more photodetectors such as photodiodes, phototransistors, photomultipliers, etc. that are configured to generate an electrical signal corresponding to the optical signal. The electrical signal generated in block 501 may be proportional to the optical power of the optical signal. The electrical signal may be provided to two gain paths that, as shown at 503 and 505. Each gain path may include one or more linear and/or logarithmic amplifiers configured to amplify the electrical signal. The two gain paths may amplify the electrical signal independently of each other. The output of one of the gain paths may be selected based on the level of a signal that corresponds to the optical signal (e.g., the level of the signal output from the currently selected gain path), as shown at 507.

Numerous variations and modifications will become apparent to those skilled in the art once the above disclosure is fully appreciated. It is intended that the following claims be interpreted to embrace all such variations and modifications.

What is claimed is:

1. An optical receiver comprising:
   a photodetector configured to generate an electrical signal in response to detecting an optical signal;
   a first gain path coupled to receive and amplify the electrical signal generated by the photodetector; and
   a second gain path coupled to receive and amplify the electrical signal generated by the photodetector, wherein the second gain path has a higher gain than the first gain path;
   wherein the first gain path and the second gain path are configured to simultaneously amplify the electrical signal independently of each other;
   wherein the first gain path includes a summation junction configured to combine an offset voltage with a voltage of the first gain path, wherein the offset voltage is proportional to a logarithm of a ratio of the gains of the first and second gain paths.

2. The optical receiver of claim 1, further comprising a switch configured to selectably output an amplified electrical signal from one of the first gain path and the second gain path based on a magnitude of a signal corresponding to the optical signal.

3. The optical receiver of claim 2, further including a trigger configured to prevent the switch from repeatedly switching when the magnitude of the signal is near a threshold level.

4. The optical receiver of claim 1, wherein the second gain path includes a linear transimpedance amplifier and a switch coupled in a feedback path of the linear transimpedance amplifier and configured to prevent the linear transimpedance amplifier from becoming saturated.

5. The optical receiver of claim 1, wherein the photodetector includes a photodiode, and wherein the first gain path is coupled to an anode contact of the photodiode and the second gain path is coupled to a cathode contact of the photodiode.

6. The optical receiver of claim 1, wherein the photodetector includes an unbiased photodiode.

7. The optical receiver of claim 1, wherein the first gain path includes a first linear amplifier and a first logarithmic amplifier.

8. The optical receiver of claim 7, wherein the first logarithmic amplifier includes a temperature stabilization device configured to keep the first logarithmic amplifier operating near a certain temperature.

9. The optical receiver of claim 8, wherein the temperature stabilization device comprises a heat-generating device.

10. A system comprising:
    photodetection means for detecting an optical signal and generating an electrical signal that corresponds to the optical signal;
    first amplification means for amplifying the electrical signal;
    second amplification means for amplifying the electrical signal, wherein the second amplification means amplify the electrical signal less than the first amplification means; and
    selection means for selecting an amplified electrical signal provided by one of the first amplification means and the second amplifier means dependent on a signal corresponding to the optical signal's power;
    wherein the first and second amplification means are configured to simultaneously amplify the electrical signal;
    wherein the first amplification means includes a summation means configured to combine an offset voltage with a voltage of the first amplification means, wherein the offset voltage is proportional to a logarithm of a ratio of the gains of the first and second amplification means.

11. A method of amplifying an electrical signal corresponding to an optical signal output by an optical component, the method comprising:
    detecting the optical signal output by the optical component and responsively generating an electrical signal corresponding to the optical signal;
    providing the electrical signal to a first amplifier path;
    providing the electrical signal to a second amplifier path;
    adding an offset electrical signal into one of the first and second amplifier paths, wherein the offset electrical signal is proportional to a logarithm of a ratio of the gains of the first and second amplifier paths; and
    selecting an amplified signal from one of the first amplifier path and the second amplifier path based on a magnitude of a signal corresponding to the optical signal;
    wherein the first amplifier path has a higher gain than the second amplifier path;
    wherein the first and second amplifier paths are each configured to simultaneously amplify the electrical signal independently of each other.

12. The method of claim 11, wherein said providing the electrical signal to a first amplifier path includes providing the electrical signal to a first linear amplifier.

13. The method of claim 12, wherein said providing the electrical signal to a first amplifier path further includes providing the electrical signal to a first logarithmic amplifier.

14. The method of claim 13, further including maintaining the first logarithmic amplifier at a first temperature.

15. The method of claim 12, further including reducing a gain of the first linear amplifier when the electrical signal exceeds a certain level.

16. The method of claim 11, wherein said selecting includes selecting the amplified signal based on a magnitude of an amplified signal output by a currently selected one of the first and second amplifier paths.

17. The method of claim 11, wherein said detecting includes a photodiode detecting the optical signal and responsively generating a current corresponding to the optical signal.

18. The method of claim 17, wherein said providing the electrical signal to a first amplifier path includes providing the current from a cathode contact of the photodiode to the first amplifier path, and wherein said providing the electrical signal to a second amplifier path includes providing the current from an anode contact of the photodiode to the second amplifier path.

19. The method of claim 11, further including providing a trigger in one of the first and second amplifier paths in order to reduce how often said selecting occurs when the magnitude of the signal is near a threshold level.

20. The method of claim 11, further including converting a currently selected amplified electrical signal from one of the first and second amplifier paths to a digital signal.

21. A method of converting an optical signal output by an optical component to an electrical signal, the method comprising:
    detecting one or more optical signals corresponding to the optical signal output by the optical component and responsively generating one or more electrical signals corresponding to the one or more optical signals;
    providing a first electrical signal to a first amplifier path;
    providing a second electrical signal to a second amplifier path;
    adding an offset electrical signal into one of the first and second amplifier paths, wherein the offset electrical signal is proportional to a logarithm of a ratio of the gains of the first and second amplifier paths; and
    selecting an amplified signal from one of the first amplifier path and the second amplifier path based on a magnitude of a signal corresponding to the optical signal output by the optical component;
    wherein the first amplifier path has a higher gain than the second amplifier path;
    wherein the first and second amplifier paths are each configured to simultaneously amplify, the first and second electrical signals independently of each other.

22. The method of claim 21, further including splitting the optical signal from the optical component into a first and a second optical signal, wherein said detecting includes a first photodiode detecting the first optical signal and responsively generating a first current and a second photodiode detecting the second optical signal responsively generating a second current, wherein said providing a first electrical signal to a first amplifier path includes providing the first current from the first photodiode to the first amplifier path, wherein said providing a second electrical signal to a second amplifier path includes providing the second current from the second photodiode to the second amplifier path.

23. A system comprising:
    a tunable laser configured to provide optical stimuli to an optical device;
    an optical receiver including:
    a photodetector configured to detect an optical signal output from the optical device in response to the optical stimuli, wherein, the photodetector is configured to generate an electrical signal corresponding to the optical signal;
    an amplifier system coupled to the photodetector and configured to amplify the electrical signal generated by the photodetector, wherein the amplifier system includes a first gain path and a second gain path each configured to independently and simultaneously amplify the electrical signal, wherein the first gain path provides a higher gain than the second gain path, and wherein the amplifier system is configured to selectably output an amplified electrical signal from one of the first gain path and the second gain path dependent on a magnitude of a signal corresponding to the optical signal;
    wherein the first gain path includes a summation junction configured to combine an offset voltage with a voltage of the first gain path, wherein the offset voltage is proportional to a logarithm of a ratio of the gains of the first and second gain paths.

24. The system of claim 23, further including an analog-to-digital converter coupled to the amplifier system and configured to convert the amplified electrical signal output from the amplifier system to a digital signal.

25. The system of claim 24, further including a data acquisition system, wherein the data acquisition system is configured to calculate the logarithm of the digital signal from the analog-to-digital converter.

26. The system of claim 23, further including an oscilloscope coupled to the amplifier system and configured to display the amplified electrical signal as a function of a wavelength of the optical stimuli.

27. The system of claim 23, wherein the second gain path includes a linear transimpedance amplifier and a switch coupled in a feedback path of the linear transimpedance amplifier and configured to prevent the linear transimpedance amplifier from becoming saturated.

28. The system of claim 23, wherein the photodetector includes a photodiode, and wherein the first gain path is coupled to an anode contact of the photodiode and the second gain path is coupled to a cathode contact of the photodiode.

29. The system of claim 23, further including a switch coupled to the first and second gain paths, wherein the switch is configured to provide the amplified electrical signal from one of the first and second gain paths to the analog-to-digital converter, wherein the switch is configured to select the one of the first and second gain paths based on whether the magnitude of the signal corresponding to the optical signal exceeds a threshold level.

30. The system of claim 29, further including a trigger configured to prevent the switch from repeatedly switching when the magnitude of the signal is near the threshold level.

31. The system of claim 23, wherein the photodetector includes an unbiased photodiode.

32. The system of claim 23, wherein the tunable laser is a wavelength-swept laser.

33. The system of claim 23, wherein the first gain path includes a first linear amplifier and a first logarithmic amplifier.

34. The system of claim 33, wherein the first logarithmic amplifier includes a temperature stabilization device configured to keep the first logarithmic amplifier operating near a certain temperature.

35. The system of claim 34, wherein the temperature stabilization device comprises a heat-generating device.

36. The system of claim 23, wherein amplifier system is configured to selectably output the amplified electrical signal from one of the first gain path and the second gain path dependent on a magnitude of a currently selected amplified electrical signal.

* * * * *